(No Model.)
J. T. KENWORTHY.
DEVICE FOR SUPPORTING WHEELS FOR THE INSERTION OF ARBORS.
No. 369,947. Patented Sept. 13, 1887.
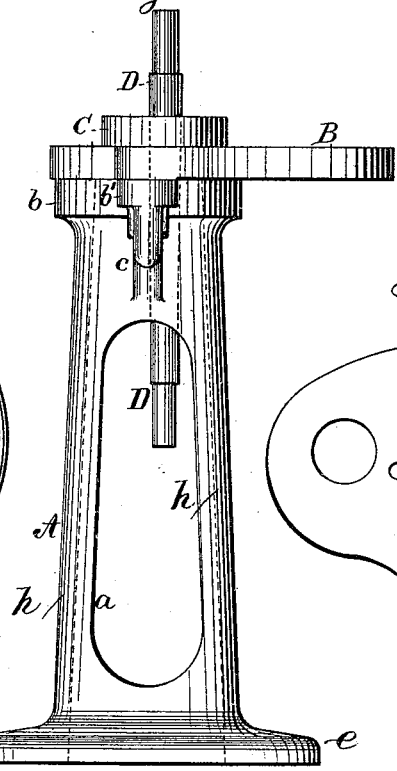
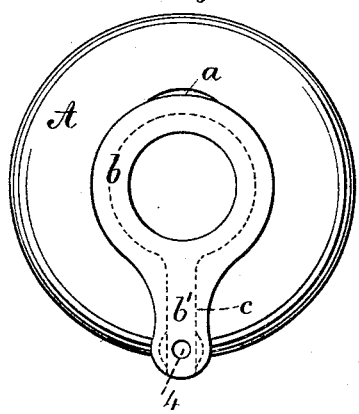
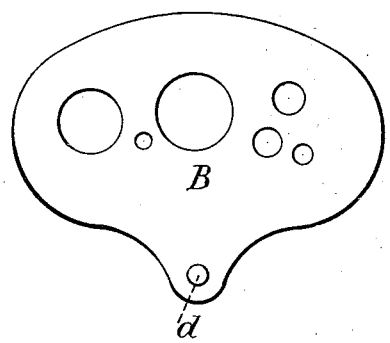
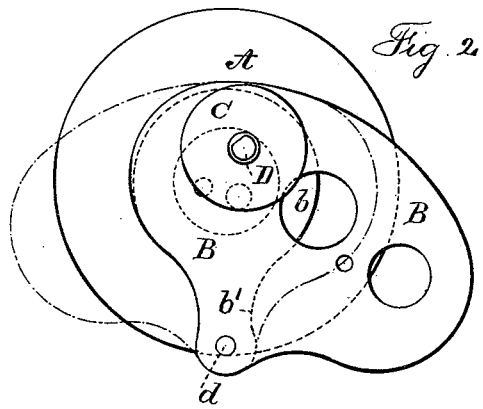
Witnesses:
J. Stait
Chas H. Smith
Inventor:
John T. Kenworthy
per Lemuel W. Serrell
Atty.

UNITED STATES PATENT OFFICE.

JOHN T. KENWORTHY, OF FLUSHING, NEW YORK, ASSIGNOR TO JOHN L. BOGERT, OF SAME PLACE.

DEVICE FOR SUPPORTING WHEELS FOR THE INSERTION OF ARBORS.

SPECIFICATION forming part of Letters Patent No. 369,947, dated September 13, 1887.

Application filed June 17, 1887. Serial No. 241,586. (No model.)

*To all whom it may concern:*

Be it known that I, JOHN T. KENWORTHY, of Flushing, in the county of Queens and State of New York, have invented an Improved Driving-Block for Mandrels and Arbors; and the following is declared to be a description of the same.

Almost all cylindrical or circular work having a central hole that is truly concentric with its external convex surface has to be turned on an arbor or mandrel. Wheels, pulleys, gears, &c., are turned in this manner. In order that the work operated upon may be rotated against the cutting-tool and not slip, the arbor or mandrel on which it is turned is made with a slight taper, so that the farther on the arbor the work is driven the more securely it is held. The devices heretofore made use of for supporting the article while the mandrel is driven in have only been adapted to one size of arbor, and are hence objectionable.

The object of this invention is to furnish a convenient means for the expeditious insertion and removal of arbors or similar devices from wheels or other articles where one piece of work requires to be driven into or out from another.

By my improvement a standard or column is made use of in combination with a plate having a series of holes so arranged that arbors or other articles of various sizes used with the wheels can be accommodated.

In the drawings, Figure 1 is an elevation of the standard and plate with an arbor and wheel thereon. Fig. 2 is a plan of the same. Fig. 3 is a plan of the standard with the plate removed, and Fig. 4 is an inverted plan of the plate.

The standard A is preferably round and of cast metal, and it is made hollow and with one or more side openings, as at $a$, between the legs or supports $h$, and at the bottom is the base $e$. The top $b$ of the hollow standard is flat and the central opening is sufficiently large for the mandrel D or other article to pass through the same freely, and there is a projection at $b'$, having a bracket, $c$, below it. A hole at 4 is bored in the outer end of the projection $b'$, for the pivot-pin $d$.

The plate B (see Fig. 4) is perforated with holes of various sizes, and these holes are all so located that they can be brought over the opening in the top $b$ by moving the plate B by swinging it upon its pivot-pin $d$, that enters the hole 4. The pivot-pin may be secured in the end of the projection $b'$, the hole therefor being in the plate B.

The wheel or other article, C, and tapering mandrel D are shown in Figs. 1 and 2, the article resting upon the plate B, and the mandrel D passing through the article and through one of the openings in the plate B and down into the hollow standard, and it is firmly secured into the wheel or article by a blow or blows struck on the upper end. After the article C has been turned to shape it is again laid upon the plate B with the largest end of the spindle downward, and the spindle is driven out and passes down into the hollow standard A, from whence it is removed through one of the side openings, $a$.

I claim as my invention—

1. The standard A, having a base, $e$, and side openings at $a$, a hollow top, $b$, and a projection, $b'$, at one side, in combination with the pivot-pin $d$ and the plate B, having holes therein of different sizes and resting upon the standard, substantially as set forth.

2. The standard A, having a base and a central opening at the top, in combination with a movable plate having holes through the same of different sizes and adapted to support the wheel or other article while the mandrel or other article is inserted or removed, substantially as set forth.

Signed by me this 7th day of June, A. D. 1887.

JOHN T. KENWORTHY.

Witnesses:
JOHN L. BOGERT,
JAMES S. SMITH.